US012632482B2

(12) United States Patent
Zhu et al.

(10) Patent No.: US 12,632,482 B2
(45) Date of Patent: May 19, 2026

(54) TRAINING A LEARNING-TO-RANK MODEL USING A LINEAR DIFFERENCE VECTOR

(71) Applicant: Microsoft Technology Licensing, LLC, Redmond, WA (US)

(72) Inventors: Xiaofeng Zhu, Bothell, WA (US); Vishal Anand, Seattle, WA (US); Cheng Wu, Bellevue, WA (US); Andres Eduardo D'Elia, Seattle, WA (US); Anuj Jain, Bothell, WA (US); Thomas Lin, Bellevue, WA (US); Matthew Adams Calderwood, Edmonds, WA (US); Eric Clausen-Brown, Boston, MA (US); Gordon John Lueck, Seattle, WA (US); Wen-wai Yim, San Francisco, CA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 473 days.

(21) Appl. No.: 18/182,149

(22) Filed: Mar. 10, 2023

(65) Prior Publication Data

US 2024/0193196 A1 Jun. 13, 2024

Related U.S. Application Data

(60) Provisional application No. 63/387,247, filed on Dec. 13, 2022.

(51) Int. Cl.
*G06F 17/00* (2019.01)
*G06F 16/334* (2025.01)

(52) U.S. Cl.
CPC ...... *G06F 16/3347* (2019.01); *G06F 16/3346* (2019.01)

(58) Field of Classification Search
CPC .......................... G06F 16/3346; G06F 16/3347
(Continued)

(56) References Cited

U.S. PATENT DOCUMENTS

| | | | |
|---|---|---|---|
| 7,783,486 B2 | 8/2010 | Sturges et al. | |
| 8,019,646 B2 | 9/2011 | Lewis-hawkins | |
| (Continued) | | | |

OTHER PUBLICATIONS

International Search Report and Written Opinion received for PCT Application No. PCT/US2023/081485, Mar. 13, 2024, 14 pages.
(Continued)

*Primary Examiner* — Paul C McCord
(74) *Attorney, Agent, or Firm* — Foley IP Law, PLLC

(57) ABSTRACT

The disclosure herein describes training a document recommendation model using loss data generated from a linear score difference vector. A training data entry is provided including a query and a set of candidate documents. A document recommendation model generates a set of document prediction scores indicative of a likelihood that the candidate documents are responses to the query and a pairwise score difference matrix is generated using the set of document prediction scores. The pairwise score difference matrix is transformed into a score difference vector using a correct document vector that indicates a correct document among the set of candidate documents. Loss data of the document recommendation model is generated using the score difference vector and the document recommendation model is adjusted using the calculated loss data. Training the document recommendation model based on the linear score difference vector reduces resource usage when compared to training with a difference matrix.

20 Claims, 7 Drawing Sheets

300

TRAINING DATA ENTRY 302
QUERY 304 | CANDIDATE DOCUMENT SET 306

DOCUMENT RECOMMENDATION MODEL 308

DOCUMENT PREDICTION SCORES 310

LOSS DATA GENERATOR 312
PAIRWISE SCORE DIFFERENCE MATRIX 314 | CORRECT DOCUMENT VECTOR 316

SCORE DIFFERENCE VECTOR 318

LOSS DATA 320

(58) Field of Classification Search
USPC .......................................................... 704/9
See application file for complete search history.

(56) References Cited

U.S. PATENT DOCUMENTS

| | | | |
|---|---|---|---|
| 8,819,007 B2 | 8/2014 | Brown et al. | |
| 9,401,881 B2 | 7/2016 | Isensee et al. | |
| 9,722,957 B2 | 8/2017 | Dymetman et al. | |
| 9,805,371 B1 | 10/2017 | Sapoznik et al. | |
| 10,635,695 B2 | 4/2020 | Seth et al. | |
| 2021/0241098 A1* | 8/2021 | Park | G06N 3/045 |
| 2022/0253447 A1* | 8/2022 | Boytsov | G06F 16/319 |
| 2022/0328064 A1* | 10/2022 | Shriberg | G10L 25/66 |
| 2023/0111978 A1* | 4/2023 | Veit | G06N 3/08 |
| | | | 706/25 |

OTHER PUBLICATIONS

Feragen, et al., "Similarity-Based Pattern Recognition," Third International Workshop, SIMBAD 2015, Copenhagen, Denmark, Oct. 12-14, 2015, 238 pages.
"Optimize and Accelerate Machine Learning Inferencing and Training", Retrieved from: https://web.archive.org/web/20210218075307/https:/onnxruntime.ai/, Feb. 18, 2021, 3 Pages.
Burges, Christopher J.C , "From Ranknet to Lambdarank to Lambdamart: An Overview", In Microsoft Research Technical Report, vol. 11, Issue 23-581, Jun. 23, 2010, 19 Pages.
Burges, et al., "Learning to Rank using Gradient Descent", In Proceedings of the 22nd international Conference on Machine Learning, Aug. 7, 2005, pp. 89-96.
Cao, et al., "Learning to Rank: From Pairwise Approach to Listwise Approach", In Proceedings of the 24th International Conference on Machine Learning, Jun. 20, 2007, pp. 129-136.
Devlin, et al., "BERT: Pre-training of Deep Bidirectional Transformers Language Understanding", In Proceedings of the North American Chapter of the Association for Computational Linguistics: Human Language Technologies, vol. 1, Jun. 2, 2019, pp. 4171-4186.
Enarvi, et al., "Generating Medical Reports from Patient-Doctor Conversations Using Sequence-to-Sequence Models", In Proceedings of the First Workshop on Natural Language Processing for Medical Conversations, Jul. 2020, pp. 22-30.
Gao, et al., "Modularized Transformer-based Ranking Framework", In proceedings of Modularized transfomer-based ranking framework, Oct. 6, 2020, 11 Pages.
Han, et al., "Learning-To-Rank With Bert In Tf-Ranking", In Repository of arXiv:2004.08476v1, Apr. 17, 2020, 5 Pages.
Huang, et al., "Learning Deep Structured Semantic Models for Web Search Using Clickthrough Data", In Proceedings of the 22nd ACM international conference on Information & Knowledge Management, Oct. 27, 2013, pp. 2333-2338.
Kannan, et al., "Smart Reply: Automated Response Suggestion for Email", In Proceedings of the 22nd ACM SIGKDD International Conference on Knowledge Discovery and Data Mining, Aug. 13, 2016, pp. 955-964.
Karpukhin, et al., "Dense Passage Retrieval for Open-Domain Question Answering", In Repository of arXiv:2004.04906v1, Apr. 10, 2020, 10 Pages.
Khattab, et al., "ColBERT: Efficient and Effective Passage Search via Contextualized Late Interaction over BERT", In Proceedings of the 43rd International Acm Sigir Conference on Research and Development in Information Retrieval, Jul. 25, 2020, pp. 39-48.
Knoll, et al., "User-Driven Research of Medical Note Generation Software", In Proceedings of the Conference of the North American Chapter of the Association for Computational Linguistics: Human Language Technologies, Jul. 10, 2022, pp. 409-421.
Li, et al., "PARADE: Passage Representation Aggregation for Document Reranking", In Repository of arXiv:2008.09093v1, Aug. 20, 2020, 13 Pages.
Lin, Chin-Yew, "ROUGE: A Package for Automatic Evaluation of Summaries", In Proceedings of Text Summarization Branches Out, Jul. 2004, 8 Pages.
Lu, et al., "Goal-Oriented End-to-End Conversational Models with Profile Features in a Real-World Setting", In Proceedings of the North American Chapter of the Association for Computational Linguistics: Human Language Technologies, Jun. 2, 2019, pp. 48-55.
Macavaney, et al., "Efficient Document Re-Ranking for Transformers by Precomputing Term Representations", In Proceedings of the 43rd International ACM SIGIR Conference on Research and Development in Information Retrieval., May 26, 2020, 10 Pages.
Michalopoulos, et al., "MedicalSum: A Guided Clinical Abstractive Summarization Model for Generating Medical Reports from Patient-Doctor Conversations", In Proceedings of Findings of the Association for Computational Linguistics EMNLP, Dec. 7, 2022, pp. 4770-4778.
Robertson, et al., "The Probabilistic Relevance Framework: BM25 and Beyond", In Journal of Foundations and Trends® in Information Retrieval, vol. 3, Issue 4, Dec. 17, 2009, pp. 333-389.
Roy, et al., "Siamese Networks: The Tale of Two Manifolds", In Proceedings of the IEEE/CVF International Conference on Computer Vision, Oct. 27, 2019, pp. 3046-3055.
Sanh, et al., "DistilBERT, A Distilled Version of BERT: Smaller, Faster, Cheaper and Lighter", In Repository of arXiv:1910.01108v1, Oct. 2, 2019, 10 Pages.
Shen, et al., "Learning Semantic Representations Using Convolutional Neural Networks for Web Search", In Proceedings of the 23rd International Conference on World Wide Web., Apr. 7, 2014, pp. 373-374.
Taylor, et al., "Softrank: Optimizing Non-Smooth Rank Metrics", In Proceedings of the International Conference on Web Search and Data Mining, Feb. 11, 2008, pp. 77-86.
Thakur, et al., "Augmented Sbert: Data Augmentation Method for Improving Bi-Encoders for Pairwise Sentence Scoring Tasks", In Repository of arXiv:2010.08240v2, Apr. 12, 2021, 15 Pages.
Valizadegan, et al., "Learning to Rank by Optimizing NDCG Measure", In Journal of Advances in Neural Information Processing Systems, vol. 22, Dec. 7, 2009, 9 Pages.
Wang, et al., "The LambdaLoss Framework for Ranking Metric Optimization", In Proceedings of the 27th ACM International Conference on Information and Knowledge Management, Oct. 22, 2018, pp. 1313-1322.
Xia, et al., "Listwise Approach to Learning to Rank: Theory and Algorithm", In Proceedings of the 25th International Conference on Machine Learning, Jul. 5, 2008, 8 Pages.
Zaheer, et al., "Big Bird: Transformers for Longer Sequences", In Journal of Advances in Neural Information Processing Systems, vol. 33, Dec. 6, 2020, 15 Pages.
Zhou, et al., "Multi-Vector Attention Models for Deep Re-Ranking", In Proceedings of the Conference on Empirical Methods in Natural Language Processing, Nov. 7, 2021, pp. 5452-5456.
Zhu, et al., "Listwise Learning to Rank by Exploring Unique Ratings", In Proceedings of the 13th International Conference on Web Search and Data Mining, Feb. 3, 2020, pp. 798-806.
International Preliminary Report on Patentability (Chapter I) received for PCT Application No. PCT/US2023/081485, mailed on Jun. 26, 2025, 9 Pages.
Hoffer, et al., "Deep Metric Learning Using Triplet Network", In Proceedings of International Workshop on Similarity-Based Pattern Recognition, Nov. 25, 2015, pp. 84-92.

* cited by examiner

FIG. 1

BACK-END

AUTOMATED QUESTION ANSWERING SERVICE 206

SCREEN THE CUSTOMER INPUT AND FIND AN ANSWER/SOLUTION

FIND AN ANSWER AND SUGGEST IT TO THE AGENT

210

220

212

"I HAVE A PROBLEM ON UPDATING <SOFTWARE>"

218

"PLEASE FOLLOW THIS LINK."

"HERE IS THE LINK."

208

216

214

CUSTOMERS 202

SUPPORT AGENT 204

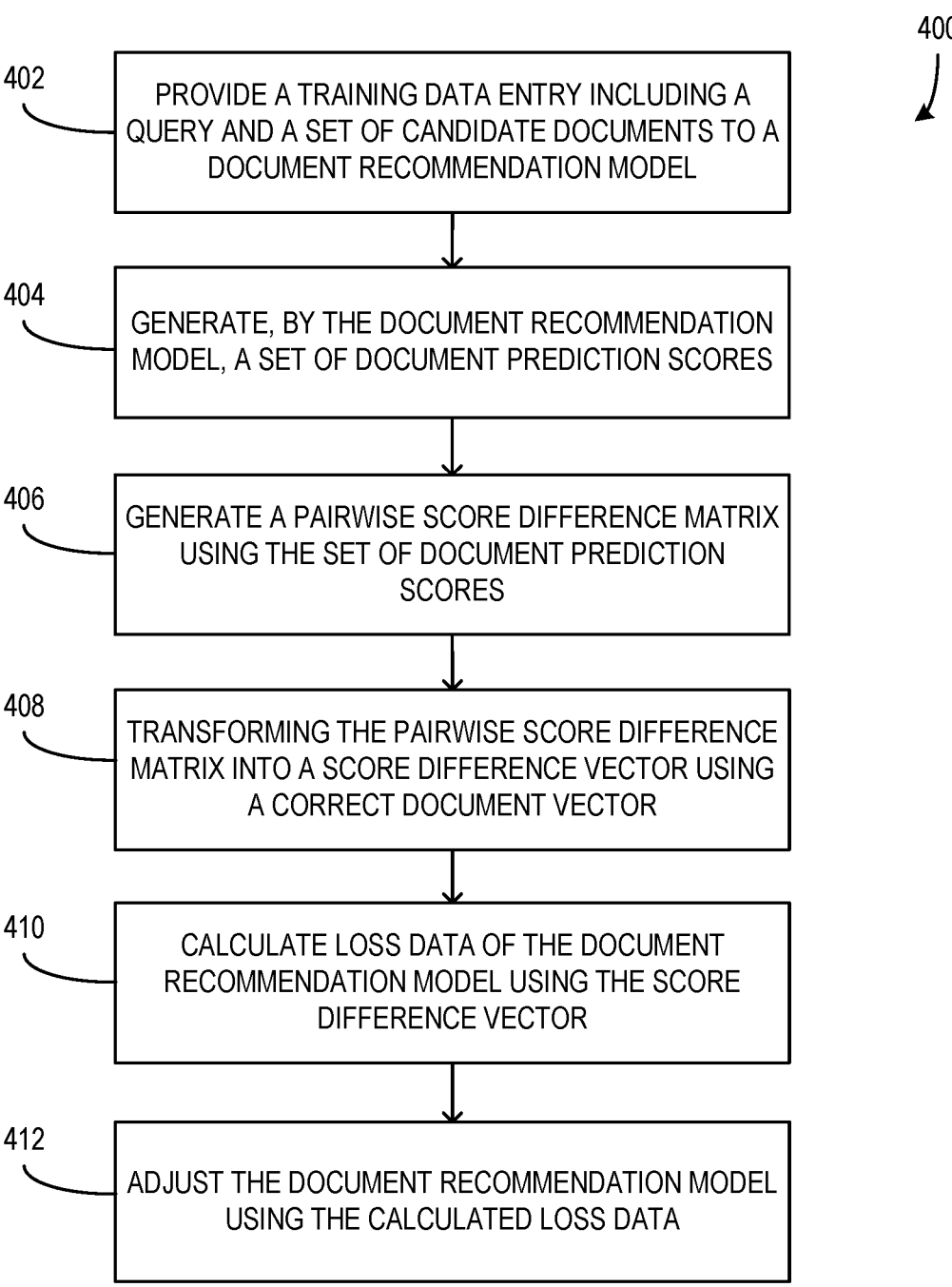

400

402　PROVIDE A TRAINING DATA ENTRY INCLUDING A QUERY AND A SET OF CANDIDATE DOCUMENTS TO A DOCUMENT RECOMMENDATION MODEL

404　GENERATE, BY THE DOCUMENT RECOMMENDATION MODEL, A SET OF DOCUMENT PREDICTION SCORES

406　GENERATE A PAIRWISE SCORE DIFFERENCE MATRIX USING THE SET OF DOCUMENT PREDICTION SCORES

408　TRANSFORMING THE PAIRWISE SCORE DIFFERENCE MATRIX INTO A SCORE DIFFERENCE VECTOR USING A CORRECT DOCUMENT VECTOR

410　CALCULATE LOSS DATA OF THE DOCUMENT RECOMMENDATION MODEL USING THE SCORE DIFFERENCE VECTOR

412　ADJUST THE DOCUMENT RECOMMENDATION MODEL USING THE CALCULATED LOSS DATA

FIG. 4

TRAINING A LEARNING-TO-RANK MODEL USING A LINEAR DIFFERENCE VECTOR

BACKGROUND

Learning-to-rank frameworks are versatile and extensible in information retrieval environments. Such frameworks are trained to rank new lists or sets of data in a similar way to rankings that exist in the training data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for training a document recommendation model using loss data generated from a linear score difference vector is described. A training data entry is provided including a query and a set of candidate documents. A document recommendation model generates a set of document prediction scores indicative of a likelihood that the set of candidate documents are responses to the query and a pairwise score difference matrix is generated using the set of document prediction scores. The pairwise score difference matrix is transformed into a score difference vector using a correct document vector that indicates a correct document among the set of candidate documents. Loss data of the document recommendation model is generated using the score difference vector and the document recommendation model is adjusted using the calculated loss data.

BRIEF DESCRIPTION OF THE DRAWINGS

The present description will be better understood from the following detailed description read in light of the accompanying drawings, wherein:

FIG. 1 is a block diagram illustrating an example system for generating prediction scores from a query and a set of candidate documents;

FIG. 4 is a flowchart illustrating an example computerized method for training a document recommendation model using loss data generated from a linear score difference vector;

Corresponding reference characters indicate corresponding parts throughout the drawings. In FIGS. 1 to 7, the systems are illustrated as schematic drawings. The drawings may not be to scale.

DETAILED DESCRIPTION

Figure 2:
FIG. 2 is a block diagram illustrating an example Smart Reply system for generating answers to customer questions using a trained service model.

Aspects of the disclosure provide a computerized method and system for training a document recommendation model using loss data generated from a linear score difference vector. The disclosure describes providing a training data set to the document recommendation model and generating document prediction scores using the model. A pairwise score difference matrix is generated from the document prediction scores. Then, a correct document vector, indicative of a correct candidate document in the set of candidate documents, is used to transform the pairwise score difference matrix into a score difference vector. Loss data is calculated from the score difference vector and the document recommendation model is adjusted using the calculated loss data.

The core challenge in numerous real-world applications is to match an inquiry to the best document from a mutable and finite set of candidates. Existing industry solutions, especially latency-constrained services, often rely on similarity algorithms that sacrifice quality for speed. The disclosure introduces a generic semantic learning-to-rank framework, Self-training Semantic Cross-attention Ranking (sRank). This transformer-based framework uses linear pairwise loss with mutable training batch sizes, achieves quality gains and high efficiency, and has been applied effectively to show gains on two industry tasks over real-world large-scale data sets: Smart Reply (SR) and Ambient Clinical Intelligence (ACI). In Smart Reply, sRank assists live customers with technical support by selecting the best reply from predefined solutions based on consumer and support agent messages. The disclosure achieves 11.7% gain in offline top-one accuracy on the SR task over the previous system and has enabled a 38.7% time reduction in composing messages in telemetry recorded since experiments began. In the ACI task, sRank selects relevant historical physician templates that serve as guidance for a text summarization model to generate higher quality medical notes. The disclosure achieves 35.5% top-one accuracy gain, along with 46% relative recall-oriented understudy for gisting evaluation-longest common sequence (ROUGE-L) gain in generated medical notes.

Learning-to-rank frameworks are versatile and extensible, especially in production environments where classification fails to scale or reaches performance limitations. In explicit information retrieval systems such as search engines, the design specifics of these frameworks are important—e.g., training and inference setup, data, and learning-to-rank model loss functions. The disclosure presents a learning-to-rank framework sRank developed for and tested on two industry tasks which both contain retrieval components with one binary relevance: Smart Reply (SR) and Ambient Clinical Intelligence (ACI). sRank is tailored toward optimization and generalization to meet production requirements for these tasks. With the popularity of deep neural ranking models in learning-to-rank, contextual featurization using Transformer models such as Bidirectional Encoder Representations from Transformers (BERT) and Big Bird largely eliminate human efforts and achieve high performance in ColBERT, PAssage Representation Aggregation for Document rE-ranking (PA-RADE), Multi-View Attention (MVA), and more. To reduce inference cost for ranking, multi-stage retrieval systems can be set up where the top k documents are first identified using ranking functions like BM25 (BM stands for Best Matching), and then neural models re-rank those k documents. Further, in some examples, production retrieval systems use CPUs for inference with relatively lightweight models, such as similarity of embedding spaces. However, these studies cannot fully address retrieval challenges for the described SR and ACI tasks. SR is a system for customer technical support chat that efficiently suggests reply messages for support agents serving multiple products. The goal of SR systems is to improve agent productivity, improve customer satisfaction, and reduce operation costs. Prefabricated, canned, or prepared reply messages are created and reviewed by agent support specialists. SR then monitors conversations between customers and support agents and suggests the top one prepared reply message that agents can quickly use when the conversation context relates to the prepared reply. Product requirements for SR include that it must present suggestions faster than the agent's normal response and search time, it must suggest replies with low error tolerance, and it must provide smart replies only when needed to avoid overwhelming agents.

In the Ambient Clinical Intelligence (ACI) task, visits between patients and physicians are recorded, transcribed by automatic speech recognition (ASR) systems, and then text generation models use this to automatically generate the needed medical note documentation for the encounter. Generating medical documentation for physicians allows physicians to provide more attentive care to their patients, instead of being distracted by note taking and documentation during the encounter. It reduces physician burnout by saving physicians from many hours of documentation work. For medical documentation, physicians often re-use templates that they have prepared beforehand for various encounter types. If a ranking model can select the physician's template that is most appropriate for each new encounter transcript, then this information can be used to guide more accurate medical note generation. Product requirements for ranking in ACI include that it must select the correct template from a set of existing templates, and it must be computationally efficient for both training and inference.

The described sRank framework addresses the challenges for SR and ACI. It effectively and efficiently applies a dual-encoder-style cross attention architecture to learning-to-rank in both training and real-time prediction, utilizing document embedding caches and self-training. The disclosure includes a training technique that enables training over candidate sets of various sizes and presents an efficient method for making pairwise cross entropy linear loss data for the described applications. Further, the disclosure is configured to return no result when there are no correct matches. As a result, the disclosed sRank framework provides for reduced resource use during training and fast, accurate generation of results during real-time prediction.

The described sRank framework is an efficient self-training cross-attention learning-to-rank model that can be used for real-time applications, various loss functions, and is scalable to mutable batch sizes. Although the disclosure herein focuses on binary relevance applications, it can also be applied to multi-level ranking or generic contrastive learning, such as twin neural networks or triplet loss.

Further, the disclosure demonstrates that pairwise cross-entropy for one binary relevance is O(n) time complexity using tensor calculation, while general RankNet loss is $O(n^2)$ with a reduction to batch-level $O(n^2)$ in an open-source learning-to-rank framework tensorflow ranking (TFR)-BERT. The disclosure reduces inference complexity by caching document embeddings and thus self-training and updating the embeddings during training. By leveraging this reduced time complexity, the disclosure reduces the consumption of processing, memory, and/or other resources during training processes.

The disclosure presents the ranking components optimized for the real-world SR and ACI industry applications. It shows 11.7% to 35.5% gain in top-one accuracy, as well as corresponding downstream application gains. These components can also be easily extended to additional industry applications.

Learning-to-rank over classical and general retrieval systems with multi-level relevance (e.g., 0-5 with 0 being irrelevant and 5 being most relevant) often favors listwise loss functions over pairwise loss functions. Listwise loss functions are also chosen over pairwise loss functions for efficiency reasons, especially in neural networks, due to their O(n) calculation instead of $O(n^2)$. However, for the retrieval components of the described applications there is only one correct document per set of candidate documents. The disclosure shows how tensor-based pairwise loss calculation can be optimized to O(n) for the described use cases.

In the below equations, let $f(q, D^q)$ be a ranking function for ranking query q and its associated candidate document set $D^q$ (q is omitted for simplicity in later sections). As there is only one correct answer for each set of candidate documents, $D^q = d^+ U D^-$, where $d^+$ is the document with label relevance of 1, and $D^-$ indicates the rest of the candidate document with label relevance of 0. Normalized discounted cumulative gain (NDCG) differences in the gradients of LambdaRank, LambdaMart, or other similar loss functions become equivalent. The disclosure primarily describes the use of representative RankNet and maximum likelihood estimation (MLE)-based loss functions that maximize the log likelihood of $P(d^+)$ in Equations 1 and 2 respectively.

$$P_t(d^+) = \frac{1}{|\{D^-\}|}\sum_{d^- \in \{D^-\}} \frac{1}{1 + e^{-(f(q,d^+) - f(q,d^-))}}. \tag{1}$$

$$P_t(d^+) = \frac{1}{1 + \Sigma_{d^- \in \{D^-\}} e^{-(f(q,d^+) - f(q,d^-))}} \tag{2}$$

The RankNet loss in Equation 1 is less likely to suffer gradient vanishing, and it can be implemented in O(n) instead of batch level $O(n^2)$ or strict $O(n^2)$. In addition, current re-ranking models generally require truncating or padding the candidate set size to obtain a universal batch size for training. The disclosure further shows how to train the described models and calculate loss effectively for complete sets of documents with varying sizes using mutable batch sizes. By enabling the use of mutable batch sizes as described, the disclosure reduces the need for using system resources to perform truncating or padding operations on candidate sets.

Prior studies such as dense passage retrieval (DPR) and PreTT define in-batch positive examples explicitly, while they draw in-batch negative examples from a larger pool in the training set, i.e., same negative examples are duplicated in different batches. In addition, training batches all have the same size. Unlike those studies, the disclosed sRank system has both an explicit positive example and explicit negative examples in each batch, resulting in variably sized batches. The disclosed sRank system thus requires fewer training resources while obtaining a better pairwise training objective. The disclosure further describes a dual-encoder cross-attention sRank that can be executed efficiently in real-time herein.

Support agent replies in SR tasks are either generic and relevant for all products or apply only for specific products. Clustering-based and classification-based solutions do not satisfy product quality and scalability requirements for this scenario where answer sets may change or grow in this manner. For the ACI template ranking task, physicians each have their own sets of historical templates, and do not choose templates from other physicians. Physicians can also have different numbers of templates, and the templates can be of varying sizes. Traditional re-ranking approaches are not ideal for this scenario because training batch size is fixed in neural models. A common solution is to truncate or pad candidate documents to a universal batch size in training. The disclosure shows a generic way of training neural systems on batches of specific sets of candidates of mutable sizes. Lastly, relevance labels are binary for both SR and ACI, meaning that at most one reply or template can be presented. In this setting, pairwise sigmoid cross entropy is more suitable than listwise loss functions.

Figure 1:
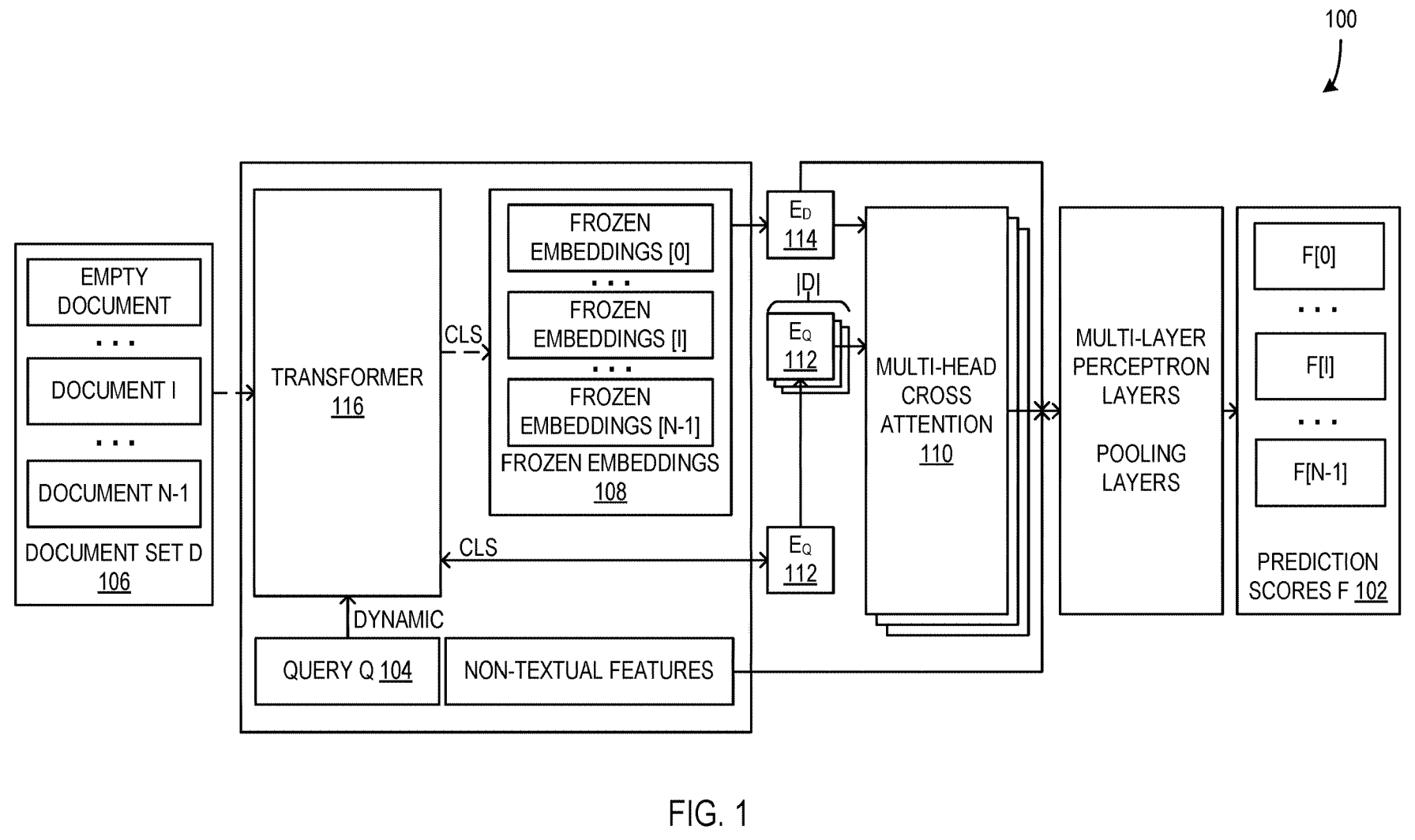

FIG. 1 is a block diagram illustrating a sRank system 100 for generating prediction scores F 102 from a query q 104 and a set of candidate documents D 106. In some examples, the system 100 is configured to use frozen embeddings 108 of the candidate documents 106 and/or other techniques to improve performance and/or accuracy of the training process of and/or use of the trained model as described herein.

The query-key-value architecture of Multi-Head Cross Attention 110 represented as ($E_q$, $E_D$, $E_D$) in FIG. 1 matches neatly with the expectations of text-based learning-to-rank studies by taking query embeddings/features $E_q$ 112 as the query and document embeddings $E_D$ 114 as the key and the value. The system 100 is configured to cache the embeddings 108 of candidate documents in the online system to reduce the inference latency from the dual encoder with cross-attention. In some examples, to ensure the inference approach works smoothly, the system 100 freezes the embeddings 108 during training.

In some examples, instead of costlier methods such as training the embeddings 108 on both queries, such as query q 104, and candidate documents 106 or pre-training transformer 116 using customized data, the system 100 utilizes the learning-to-rank training process to update the weights in the transformer 116 to generate more informative embeddings 108 for the candidate documents 106. The embeddings 108 of candidate documents 106 are updated after several training epochs (e.g., 10) until the model of the system 100 converges. Further, the system 100 applies multi-head cross attention 110 to the frozen embeddings 108 of candidate documents $E_D$ 114 and the dynamic embeddings of each query $E_q$ 112, tiled to |D|.

In some examples, the batch in the sRank system 100 contains a serialized record of one question, and embeddings 108 of its candidate documents 106 and feature shapes using Parquet, enabling processing and training of candidate sets with mutable sizes. The negative examples come only from each serviced product's reply set in the SR task and each individual physician's template set in the ACI task. Negative examples are not duplicated, in contrast to DPR. Questions are not duplicated, in contrast to TFR-BERT. Therefore, the described systems, processes, and/or models save training data resources and eliminate unnecessary computation of passing data to Transformer. In some such examples, the system 100 is configured to apply open neural network exchange (ONNX) quantization to inference.

In some examples, the training process associated with system 100 is made more efficient by improving the efficiency of calculation of loss data and/or values. For instance, in an example, a matrix of pairwise prediction score differences between each pair of candidate documents, which is two dimensional, is converted to a one dimensional vector that includes only the prediction score differences between all candidate documents and the correct document. Thus, the calculation complexity of associated loss values is substantially reduced, and the efficiency of the associated process is improved. An example of this is described with respect to Algorithm 1, below.

Algorithm 1, below, shows the O(n) tensor-based pairwise loss calculation optimized for the described use cases. Matrix P_DIFF of size n×n contains the pairwise prediction score differences and vector L_DIFF of size n×1 contains the linear score differences between all the candidate documents and the correct document. In some examples, the system 100 is configured to split candidate documents into multiple batches with the correct document in each batch when n is too large for GPU memory and/or another capacity of the system is exceeded.

In some examples, in the optimized loss function in Algorithm 1, Y is the vector of correct labels, e.g., (0, 1, 0, 0), of a list of n candidate documents for a query q, wherein the '1' value corresponds to the correct document of the candidate documents and the '0' values correspond to the remaining candidate documents. Further, $$f(q, (d_i)_{i=1}^n)$$

is the ranking model/function that returns n prediction scores. Matrix P_DIFF of size n×n indicates the pairwise prediction score differences and vector L_DIFF of size n×1 indicates the linear score differences between all of the candidate documents and the correct document. As there is only one 1 in Y, $\Sigma((1-Y)\odot\ln(1+S))$ is equivalent to $-\ln 2 + \Sigma\ln(1+S)$. Generalizing this loss, the system 100 is configured to split correct documents into multiple batches with the correct document in each batch when n is too large for GPU memory.

Algorithm 1: Linear Pairwise Loss for Single Correct Document

1: Input: labels $$Y = (Y_i)_{i=1}^n$$

2: Input: prediction scores $$F = f(q, (d_i)_{i=1}^n)$$

3: P_DIFF←F–F$^T$
   4: L_DIFF←P_DIFF·Y
   5: S←exp(L_DIFF)
   6:

$$\text{loss} \leftarrow -\frac{1}{n-1}\Sigma((1-Y)\odot\ln\frac{1}{1+S})$$

7:

$$\text{loss} \leftarrow \frac{-\ln2 + \Sigma\ln(1+S)}{n-1}$$

wherein is only one correct document in Y
   8: Return: loss

FIG. 2 is a block diagram illustrating a Smart Reply system 200 for generating answers to customer questions using a trained service model. Smart Reply (SR), shown in FIG. 2, is a system for customer technical support chat that efficiently suggests reply messages for support agents serving multiple products. The goal of the system 200 is to improve agent productivity, improve customer satisfaction, and reduce operation costs. Prefabricated/canned/prepared reply messages are created and reviewed by agent support specialists. SR then monitors conversations between customers 202 and support agents 204 and suggests the top one prepared reply message that agents 204 can quickly use when the conversation context relates to a prepared reply. Product requirements for SR include that it must present suggestions faster than the agent 204's normal response and search time, it must suggest replies with low error tolerance, and it must provide smart replies only when needed to avoid overwhelming agents 204.

At 208, a customer 202 asks a question of the SR system 200 and at 210, the question is provided to the Automated Question Answering Service (AQAS) 206. At 212, the AQAS 206 screens the customer question input and identifies an answer that is likely to be correct. At 214, the AQAS 206 provides the answer to the support agent 204 and, at 216, the support agent 204 confirms or denies that the answer is correct. If the answer is correct, at 218, the support agent 204 causes the answer to be provided back to the customer 202. Further, at 220, the confirmation that the answer was correct is provided back to the AQAS 206 (e.g., to train the service model). Alternatively, if the answer is incorrect, the support agent 204 does not cause the answer to be provided to the customer 202 and the indication that the answer was incorrect is provided back to the AQAS 206 at 220. Further, in some examples, the support agent 204 takes another action, such as manually responding to the customer question, redirecting the customer question to another support agent with expertise needed to answer the question, or the like.

In some examples, the SR system 200 includes or otherwise interacts with the sRank system 100 of FIG. 1 as described above. In such examples, the sRank system 100 is used as part of the AQAS 206 to generate a suggested answer which is provided to the support agent.

In some examples, the described method and system reduces training time complexity from $O(n^2)$ squared complexity to $O(n)$ linear complexity and reduces and/or avoids gradient vanishing. Well-known pairwise loss objective functions require $n(n-1)$ pair-to-pair comparisons, which is not efficient for training neural retrieval models. The disclosure proposes a novel linear matrix-level pairwise loss calculation (e.g., reduction from 100 times to 10 times) given that there can be at most one correct/positive document (e.g., see Algorithm 1 as described above). The proposed solution can avoid gradient vanishing compared to the existing alternative list maximum likelihood loss.

Further, in some examples, the disclosure reduces data entries required for training a retrieval system from roughly squared to linear. Widely used industrial systems such as DPR include negative documents from all the documents outside the set associated with a query leading to data redundancy. Another industrial framework TFR-BERT duplicates a query n times and can repeat negative documents in several batches. The disclosure uses the query only once and only the set of documents associated with the query (no outside documents nor document padding).

Further, in some examples, the disclosure reduces the cost of building the retrieval component and real-time inferencing. Reduction of training time (complexity) has the direct effect of reducing the computation cost of training models on GPUs. In addition, as the disclosure caches the document embeddings/features during real-time inference, it can use CPU machines for model serving instead of GPUs to meet the latency requirements.

In some examples, the disclosure breaks the constraint of having fixed-size batches for training neural retrieval models. Neural networks need to be trained on batches of the same fixed size. The disclosure utilizes data serialization to alter the dimensionality of, or squeeze, data of different modality (e.g., text features, numerical features, and corresponding feature dimensions) so that it can recover the original shapes of the features using the dimensions. All features and related feature dimensions are formatted as a dictionary of key-value pairs with keys being unique identifiers in deserialization and values being specific features then convert all such data entries into binary files containing byte-strings. For instance, during data serialization, the width and height dimensions of candidate document embeddings, wherein the width is the embedding size and the height is the number of candidate documents are stored, are included in the serialized data; during data deserialization, the embedding matrix of candidate documents using the width and height dimensions are recovered and the vector of ground-truth labels using the height dimension are recovered. Therefore, the disclosure can train the model on candidate documents of mutable (batch) sizes, which avoids truncating or padding candidate documents.

Further, in some examples, the disclosure improves product and system features and performance when applied to customer service processes as described herein. For instance, in an example, the disclosure uses this retrieval component in large-scale experiments on automated customer support platforms and medical summarization platforms.

With growing candidate replies/documents, classification or clustering as used in other systems is no longer scalable or accurate, and text generation approaches often do not pass compliance guidance. Therefore, the disclosure utilizes a combination of a fast sub-word classifier and the proposed semantic learning-to-rank model to address these issues.

There is at most one correct reply/document in the use cases addressed by the disclosure, while existing retrieval systems always return top-k most relevant documents. The targeting of use cases with one correct reply enables the described improvements of computational efficiency and other resource usage.

Saving model training costs is vitally important for companies and their customers. The disclosure, which provides a reduction of training time and data use from a squared scale to a linear scale, is an attractive solution to these issues. As described herein, the proposed learning-to-rank model can explicitly and implicitly improve large-scale products through the reduction of training time and consumption of associated resources.

Figure 3:
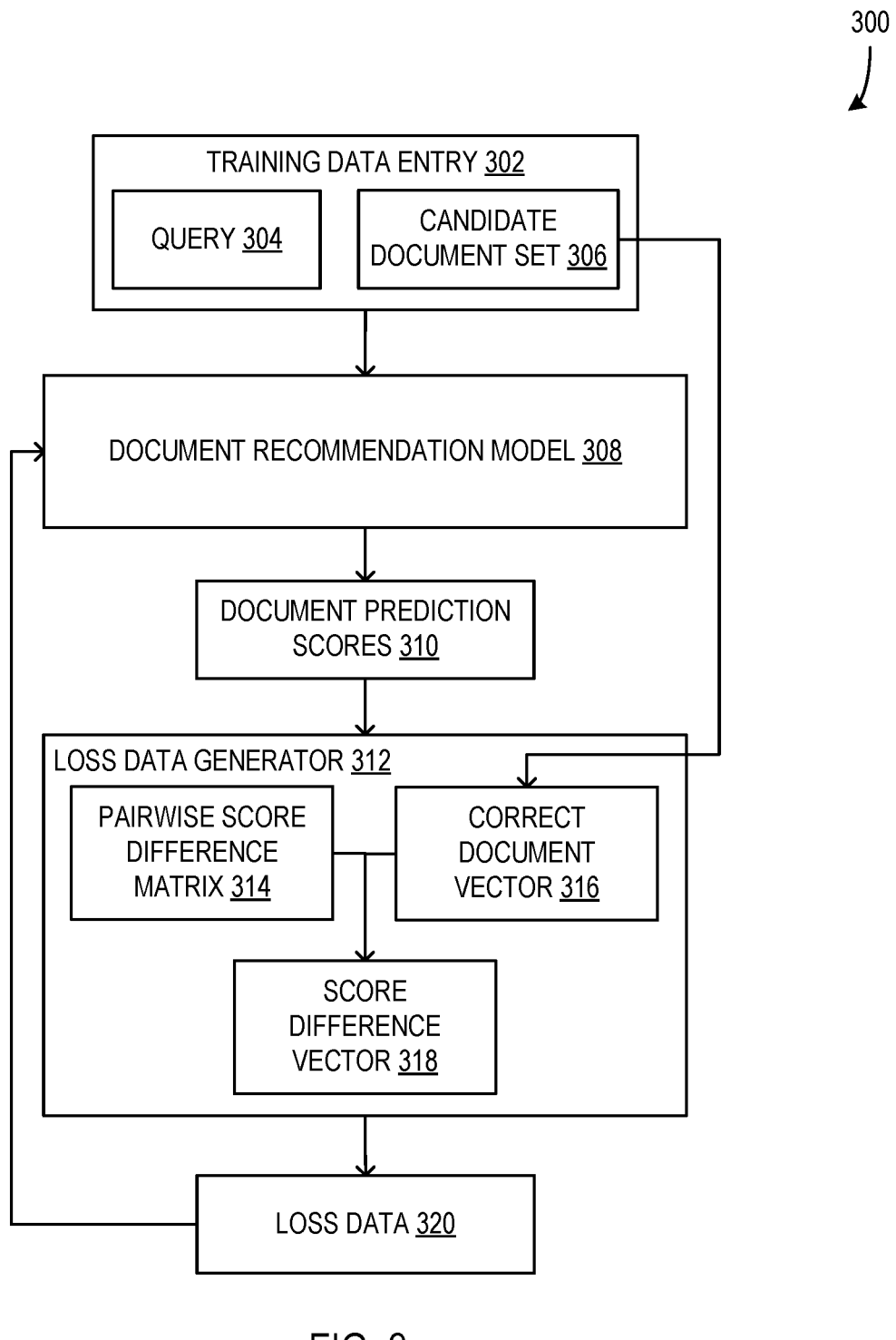
FIG. 3 is a block diagram illustrating an example system configured for training a document recommendation model using loss data generated by a loss data generator.

FIG. 3 is a block diagram illustrating a system 300 configured for training a document recommendation model 308 using loss data 320 generated by a loss data generator 312. In some examples, the document recommendation model 308 is a model as described above with respect to FIG. 1, including that the model 308 includes a transformer and multi-head cross attention layers for generating document prediction scores 310. Further, in some such examples, the document recommendation model 308 is configured to operate as described above with respect to FIG. 1, including the serialization and deserialization of training data, the freezing of document embeddings, and the like. Still further, it should be understood that, in some examples, the system 300 includes and/or is executed using computing devices such as the computing apparatus 700 of FIG. 7 without departing from the description.

The system 300 illustrates a training data entry 302 being provided to the document recommendation model 308. The training data entry 302 includes a query 304, a candidate document set 306, and labels of the candidate documents in the candidate document set 306 (e.g., an indicator of the correct candidate document used to determine the correct document vector 316). The query 304 includes data that is representative of the type of input queries that the document recommendation model 308 is being trained to process. For instance, in examples where the model 308 is being trained to respond to customer service requests, the query 304 includes data of an example customer service request. The candidate document set 306 includes a plurality of documents that are associated with the query 304 and/or that could be the correct response to the query 304. In the customer service example, the candidate document set 306 includes a set of response documents that include data for responding to customer service queries, including the customer service query of the query 304.

The document recommendation model 308 includes hardware, firmware, and/or software for generating document prediction scores 310 from queries 304 and candidate document sets 306. The document prediction scores 310 include data values for each candidate document in the candidate document set 306 that are indicative of a relative likelihood that the associated candidate document is the correct document in response to the query 304. In some examples, the highest document prediction score of the scores 310 indicates that the associated candidate document is the most likely document to be the correct document in response to the query 304. Further, the document recommendation model 308 is configured using machine learning techniques, such that the model 308 can be trained using iterative machine learning processes as described herein.

The loss data generator 312 includes hardware, firmware, and/or software configured to generate loss data 320 from the document prediction scores 310 and an indicator of the correct document in the candidate document set 306. In some examples, the loss data generator 312 is configured to generate a pairwise score difference matrix 314 from the document prediction scores 310, wherein the entries of the matrix 314 include data indicative of difference values between each pair of document prediction scores 310. The pairwise score difference matrix 314 is combined with the correct document vector 316 to form the score difference vector 318, which includes data values indicative of differences between the document prediction scores 310 and the document prediction score associated with the correct document of the candidate document set 306.

Further, in some examples, the loss data generator 312 is configured to perform operations for implementing Algorithm 1 as described above.

The score difference vector 318 is used by the loss data generator 312 to generate the loss data 320. The loss data 320 is then used to adjust the document recommendation model 308 using machine learning techniques. It should be understood that, in some examples, this process is performed repeatedly over many iterations using a plurality of training data entries of a training data set to continuously improve the performance of the document recommendation model 308.

FIG. 4 is a flowchart illustrating a computerized method 400 for training a document recommendation model (e.g., document recommendation model 308) using loss data (e.g., loss data 320) generated from a linear score difference vector (e.g., score difference vector 318). In some examples, the method 400 is executed or otherwise performed in a system such as the systems 100 and 300 of FIGS. 1 and 3, respectively.

At 402, a training data entry is provided to the document recommendation model. The training data entry includes a query (e.g., query 304), a candidate document set (e.g., candidate document set 306), and labels of the candidate documents in the candidate document set as described above with respect to training data entry 302 of FIG. 3.

At 404, a set of document prediction scores (e.g., document prediction scores 310) is generated by the document recommendation model. The document prediction scores are indicative of the likelihood that the candidate documents are correct responses to the query.

At 406, a pairwise score difference matrix (e.g., pairwise score difference matrix 314) is generated using the set of document prediction scores. At 408, the pairwise score difference matrix is transformed into a score difference vector (e.g., score difference vector 318) using a correct document vector (e.g., correct document vector 316). The correct document vector includes a one value indicative of a correct candidate document of the set of candidate documents and zero values indicative of other candidate documents in the set of candidate documents. It should be understood that the pairwise score difference matrix is of a squared scale (e.g., there are n×n values in the matrix where n is the quantity of prediction scores) and that the score difference vector is of a linear scale (e.g., there are n values in the vector where n is the quantity of prediction scores).

At 410, loss data (e.g., loss data 320) of the document recommendation model is calculated using the score difference vector and, at 412, the document recommendation model is adjusted using the calculated loss data.

Further, in some examples, the document recommendation model is a learning-to-rank model with a transformer and a cross-attention component. In some such examples, the adjustment of the model includes adjusting layers of the model, including transformer layers, cross attention layers, or the like.

Additionally, or alternatively, in some examples, the document recommendation model is adjusted using calculated loss data multiple times during a plurality of training iterations using a training data set including a plurality of training data entries. Generating the set of document prediction scores includes freezing document embeddings of the set of candidate documents during the plurality of training iterations, whereby the model is not required to generate new document embeddings for each iteration.

Further, in some examples, the document recommendation model is trained for recommending a customer support response document. Alternatively, the document recommendation model is trained for recommending a medical template document for generating a medical summary.

In some examples, the training data entry is prepared from a larger superset of training data. For instance, in some such examples, the set of candidate documents is selected from a larger superset of candidate documents such that the selected set of candidate documents includes only a single correct response document to the query. Additionally, in some such examples, other training data entries are prepared from the larger superset of training data and used to train the document recommendation model as described herein. The other training data entries include entries that have different quantities of candidate documents, because the document recommendation model is configured to be trained using training data entries of mutable sizes as described herein. In some examples, the use of training data entries of mutable sizes is enabled by the training data entries being serialized into binary files containing byte-strings as a step in preparing the training data entries for use.

Additional Examples

Figure 5:
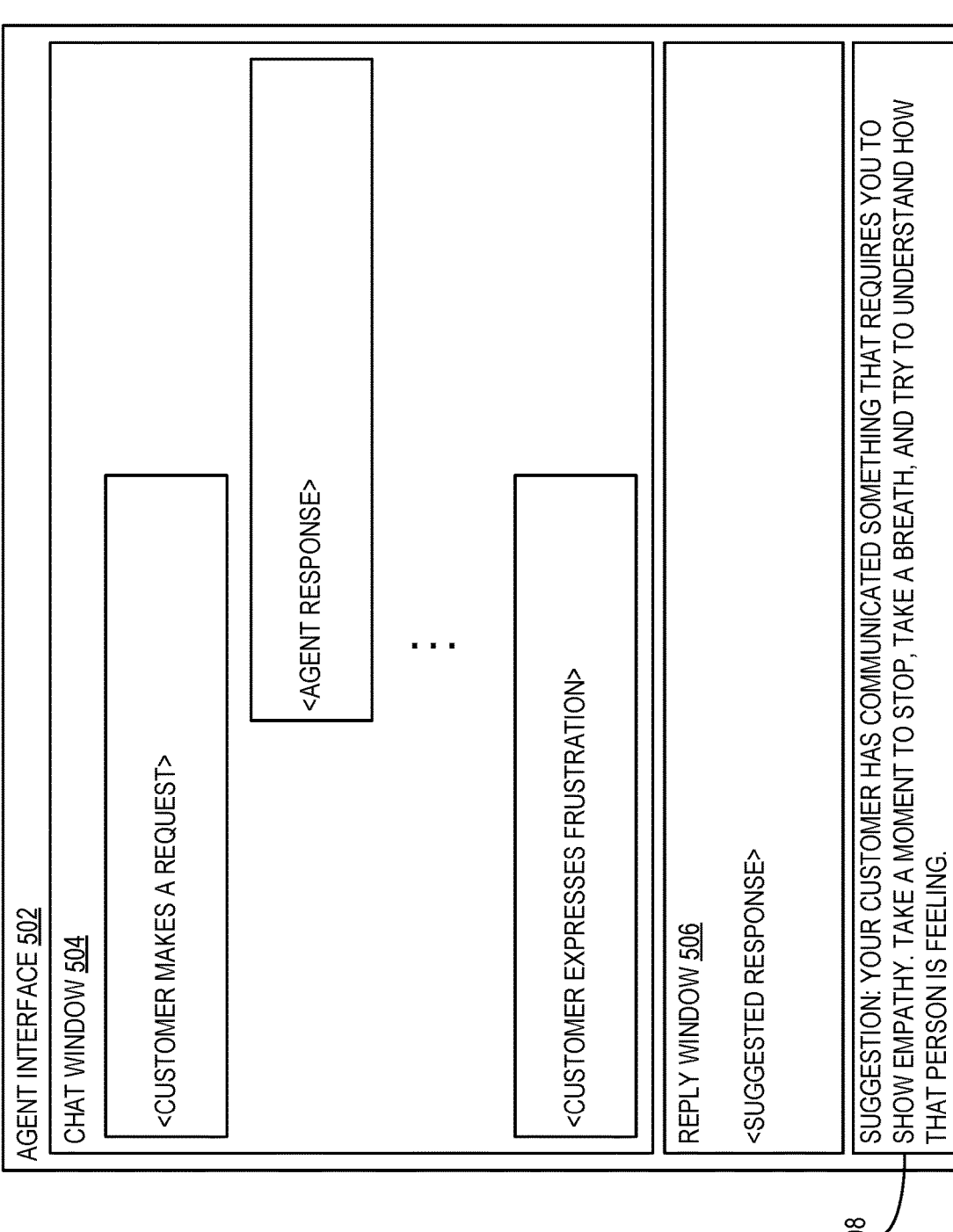
FIG. 5 is a block diagram illustrating an example agent interface configured to provide an agent with suggested response.

In some examples, the disclosure is further configured to detect empathy replies and to generate case alerts based on detected replies. See the illustrated screenshot 500 of FIG. 5. For instance, in some such examples, agent and/or customer frustration is detected from sentiment in their replies. A customer can become frustrated and/or angry in response to the length of the process (e.g., see the customer's expression of frustration in the chat window 504 of the agent interface 502) and/or an agent can become sarcastic or even insulting because they are getting frustrated. An indication of such frustration could be in the form of voice pitch or text. In such cases, agents sometimes make fun of the customers or even say hurtful things. A rating alone does not help solve this problem, because the customers have already been negatively affected. Before an agent becomes frustrated and/or burnt out, they will be alerted or highlighted to an agent manager, who is enabled to take them off the current case and/or to transfer the case to another agent. Additionally, or alternatively, frustration on the part of a customer can be detected and addressed through suggested empathetic responses. For instance, after the customer expresses their frustration in the chat window 504, the reply window 506 is populated with a suggested response and an empathy notification 508 is displayed to the agent to remind the agent to behave in an empathetic way. After-the-fact reporting does not provide this capability, but live reporting on customer and/or agent behavior can provide this functionality for the benefit of all involved.

In some examples, agent workflow performance is tracked (e.g., tiredness, time of day, pre-lunch timeframes, end of shift timeframes, abusive customer follow-ups, or indications that training is needed) and cases are transferred to a new agent who is more experienced/patient when issues are detected. For instance, in an example, Agent Bob has been working on customer cases for 4 consecutive hours. The system detects such scheduling and pops up a reminder to suggest that Bob can take a break. If Bob accepts the suggestion, the system then temporarily stops sending new cases to Bob and/or transfers his current case to a different agent until Bob is back and refreshed.

Further, in some examples, the system detects scheduling issues such as opening cases close to lunch time or another common break time based on local time zones of agents and redistributes cases to other agents to avoid these times.

Additionally, or alternatively, the system is configured to manage customer and agent exhaustion matching and better agent behavior training (e.g., the system prioritizes scheduling such that more than 40% of active agents are "fresh" (agents that have recently started a shift) at any point of time). For instance, in an example, Customer Rob has not had a pleasant experience interacting with agents. Rob is likely to stop using the current service provider based on one or a few such bad interactions. The system is configured to ensure Rob gets routed to a non-exhausted agent.

Figure 6:
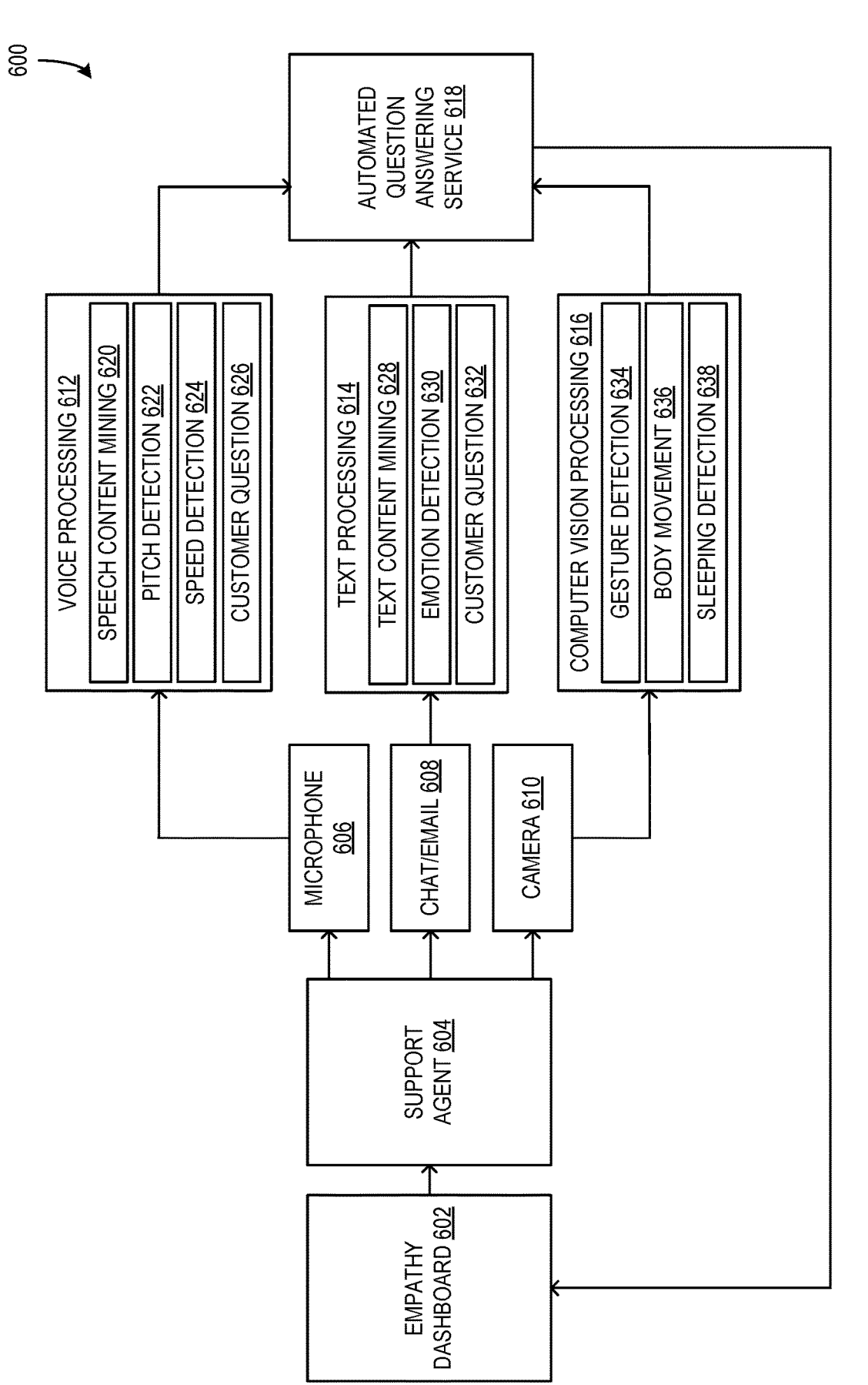
FIG. 6 is a block diagram illustrating an example system for providing suggested empathetic responses to a support agent based on collected data.

In some examples, the system is configured to support multimodal inputs as shown in system 600 of FIG. 6. System 600 includes an empathy dashboard 602 (e.g., the agent interface 502 of FIG. 5) for use by support agent 604. The empathy dashboard 602 is configured to provide the support agent 604 with suggested empathetic responses to customers as described herein. Data about the support agent 604's current physical and mental state are collected through one or more channels (e.g., a microphone 606 or other audio channel, a chat and/or email 608 channel, and/or a camera 610 or other video or image channel). The data collected from the one or more channels are processed via voice processing 612 (e.g., speech content mining 620, pitch detection 622, speed detection 624, and/or customer question data 626), text processing 614 (e.g., text content mining 628, emotion detection 630, and/or customer question data 632), and/or computer vision processing 616 (e.g., gesture detection 634, body movement detection 636, and/or sleeping detection 638). The processed data is provided to an AQAS 618 (e.g., the AQAS 206 of FIG. 2) and the AQAS 618 is configured to use the processed data to identify moments when empathetic responses are necessary, to prompt the support agent 604 to respond with empathy, and/or to provide suggested empathetic responses to the support agent 604 via the empathy dashboard 602.

Further, in some such examples, the system is configured to use pitch analysis, gesture and body movement detection, and/or conversation (speech and text) content mining to predict an agent's physical and emotional health status in real time and provide agents with support they need in real-time. For instance, in an example, Agent Joe is a support agent who is scheduled to work 8 hours a day and 7 days a week. Sometimes he feels tired and has feelings of anxiety. The described empathy safeguard with a guided technical workflow is configured to automatically monitor Joe's physical and emotional health status via a multi-channel and multimodal inputs from voice data and/or other captured data such as gestures and/or body movements on video. This workflow processes the data from Joe's inputs, such as pitch, tongue, voice speed, voice content, chat speed, chat content, and as well as body movement, gesture, tiredness etc. to predict Joe's physical and emotional health status. Additionally, or alternatively, the described empathy safeguard automatically identifies a customer's question or comment from the captured communication data and it will find a best available empathetic reference answer for Joe if such an answer is available. All the information, including Joe's physical and mental health status, and as well as an empathetic reference answer to the current customer's question will be presented to Joe via the Empathy Dashboard to help Joe effectively to manage and reduce work stress.

Experiments

This section describes experiments and measurements for ranking in SR and ACI. The primary metric in offline evaluation is top-one accuracy because at most one reply message for SR and at most one physician template for ACI are suggested. The proposed loss is 2-7% better than the MLE loss on the two tasks.

The Smart Reply task is to take the most recent support agent message and the most recent customer message in a customer support conversation, and choose the best reply from a set of canned reply templates. An example Smart Reply could be "This link has step-by-step instructions for how to activate <requested software>." An efficient CPU-based classifier is applied at runtime to classify which specific product an incoming support message interaction is for, and then the learning-to-rank model is used to select the best reply from the canned replies for that product. Smart Reply is able to support customer support interactions across 22 products that are supported by the customer support platform.

Table 1, below, describes statistics for the Smart Reply task. Data augmentation was used to generate synthetic conversations, and it increased the data set size to 10 million. Training and test data were based on an 80%:20% split ratio. Customized tokenization was first applied to message pairs and canned replies, and then Distil-BERT was used to vectorize the queries and documents for ranking. One difference from traditional retrieval systems which always retrieve the top-k documents is that the large quantities of replies that do not sufficiently fit the issue can overwhelm support agents. To achieve this, a "Silent" class is added in the product classifier and an "Empty" canned reply is included in each candidate reply set. Appending a message pair that returns the "Silent" class or "Empty" reply to non-empty questions enriched non-empty triplets, and using agent or customer messages further enlarged the data size.

Table 2, below, shows the 11.7% offline top-one accuracy gain of sRank compared to previous deep structured semantic model (DSSM)-based system that took transformer embeddings as inputs. Smart Reply was exposed to insider agents for initial feedback and then to 50% of global agents during A/B testing. sRank also increased clickthrough rate (CTR) on Smart Replies by an absolute 42.5%. During A/B testing, Smart Reply with sRank led to 13.4% increase in agent satisfaction compared to the group not using Smart Reply, and agents composed replies 38.7% faster with Smart Reply.

TABLE 1

SR data statistics

| | |
|---|---|
| Cleaned customer-agent message pairs | 1.3 million |
| Maximum input tokens | 512 |
| Canned reply templates | 200 |
| Supported products | 22 |
| Canned reply templates per product | 3-26 |
| Data set size with augmentation | 10 million |

TABLE 2

SR offline and online metric gains (%)

| | |
|---|---|
| Top-one accuracy gains | 11.7 |
| Click-through rate (CTR) uplift | 42.5 |
| Agent satisfaction improvement | 13.4 |
| Time reduction for composing agent messages | 38.7 |

The second industry task that is considered is Template Ranking in Ambient Clinical Intelligence. Physicians can have sets of templates that they start from when composing medical documentation. An example of a template could be: "General Appearance: Height_inches. Weight_pounds. The patient is alert and oriented and in no distress." If a template ranking system can automatically select the best template to use for an encounter, then this can be used to guide the automatic generation of a more accurate artificial intelligence (AI) medical note.

Table 3, below, describes statistics for the ACI task. For this task, the query is the medical encounter transcript, and the candidate documents are physician's templates plus an "Empty" template to represent if no template should be used. In some examples, Big Bird RoBERTa was used to generate conversation and template embeddings. Once the ranking model selected a template for an encounter, the template and the encounter transcript were concatenated and passed to the note generation model to generate the medical note. The process focused on guiding generation of the Physical Exam section of Orthopedics clinical notes because this section often employs templates. The baseline system is a dense passage retrieval (DPR) ranking model which meets the inference time requirements for this task.

TABLE 3

ACI template modeling configuration

| | |
|---|---|
| Medical encounters for ranker training | 1 million+ |
| Maximum input tokens | 4096 |
| Total number of medical templates | 6118 |
| Medical templates per physician | 8-39 |

When medical note generation is guided by the correct template that the physician would use (the "oracle" template), this significantly increases the quality of generated medical notes. The challenge is then how to predict the correct template at run time. Note generation with no template guidance achieved only 46% of the ROUGE-L of using oracle guidance. The DPR model was unable to predict templates at sufficient accuracy, and using its templates led to a 2% ROUGE-L drop compared to not using templates. sRank predicted templates more accurately, and end-to-end ROUGE-L with sRank was 92% of oracle ROUGE-L. This highlighted the ability of sRank to effectively guide the generation of higher quality medical notes. Table 4 shows sRank metrics for ACI. For ranking metric gains, sRank achieved 35.5% higher top-one accuracy than the DPR model with 7.5% less inference time. To evaluate robustness of sRank to template editing (the scenario where a physician further edits their templates after ranker training), it was also verified that it achieved accuracy gains across subsets of physicians whose test encounters contain edited templates at various frequencies.

TABLE 4

ACI sRank metric gains (%)

| | |
|---|---|
| ROUGE-L of baseline relative to ROUGE-L with oracle templates | 46.0 |
| ROUGE-L of sRank relative to ROUGE-L with oracle templates | 92.0 |
| Top-one accuracy gain over DPR | 35.5 |
| Top-one accuracy gain (<25% new templates) | 41.5 |
| Top-one accuracy gain (25-75% new templates) | 40.6 |
| Top-one accuracy gains (>75% new templates) | 20.7 |

Exemplary Operating Environment

Figure 7:
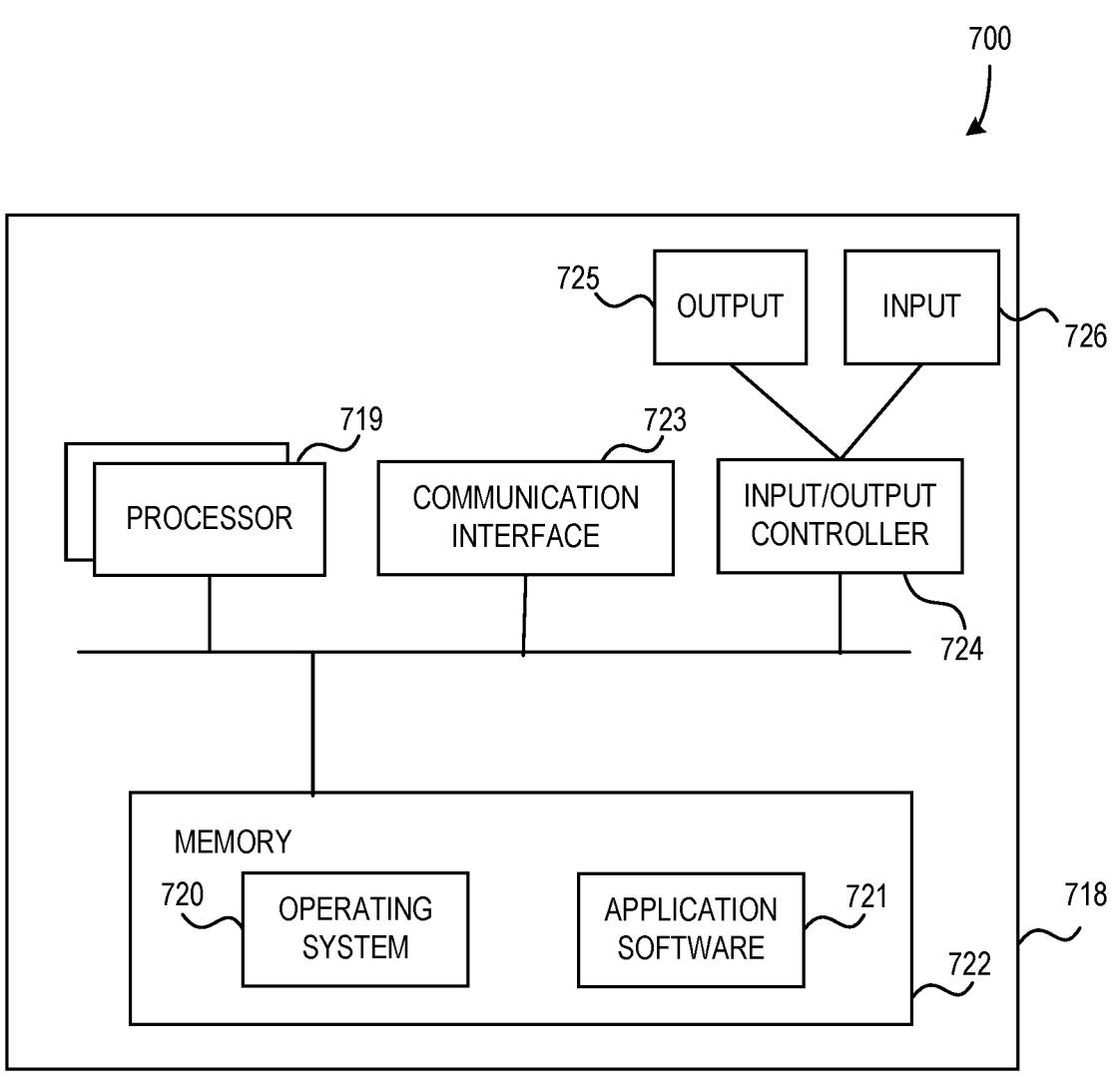
FIG. 7 illustrates an example computing apparatus as a functional block diagram.

The present disclosure is operable with a computing apparatus 700 according to an embodiment as a functional block diagram in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, training a model for providing suggested responses to customers as described herein is accomplished by software, hardware, and/or firmware.

In some examples, computer executable instructions are provided using any computer-readable media that are accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receives output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to, with the processor, cause the processor to: provide a first training data entry including a query, a set of candidate documents to a document recommendation model, and a label indicating a correct document of the set of candidate documents; generate, by the document recommendation model, a set of document prediction scores indicative of a likelihood that the set of candidate documents are responses to the query; generate a pairwise score difference matrix using the set of document prediction scores; transform the pairwise score difference matrix into a score difference vector using a correct document vector, based on the label of the first training data entry, that includes a one value indicative of a correct candidate document of the set of candidate documents and zero values indicative of other candidate documents of the set of candidate documents; calculate loss data of the document recommendation model using the score difference vector; and adjust the document recommendation model using the calculated loss data.

An example computerized method comprises: providing a first training data entry including a query, a set of candidate documents to a document recommendation model, and a label indicating a correct document of the set of candidate documents; generating, by the document recommendation model, a set of document prediction scores indicative of a likelihood that the set of candidate documents are responses to the query; generating a pairwise score difference matrix using the set of document prediction scores; transforming the pairwise score difference matrix into a score difference vector using a correct document vector, based on the label of the first training data entry, that includes a one value indicative of a correct candidate document of the set of candidate documents and zero values indicative of other candidate documents of the set of candidate documents; calculate loss data of the document recommendation model using the score difference vector; and adjust the document recommendation model using the calculated loss data.

One or more computer storage media having computer-executable instructions that, upon execution by a processor, cause the processor to at least: provide a training data entry including a query, a set of candidate documents to a document recommendation model, and a label indicating a correct document of the set of candidate documents; generate, by the document recommendation model, a set of document prediction scores indicative of a likelihood that the set of candidate documents are responses to the query; generate a pairwise score difference matrix using the set of document prediction scores; transform the pairwise score difference matrix into a score difference vector using a correct document vector, based on the label of the training data entry, that includes a one value indicative of a correct candidate document of the set of candidate documents and zero values indicative of other candidate documents of the set of candidate documents; calculate loss data of the document recommendation model using the score difference vector; and adjust the document recommendation model using the calculated loss data.

Alternatively, or in addition to the other examples described herein, examples include any combination of the following:

wherein the document recommendation model is a learning-to-rank model with a transformer and a cross-attention component.

wherein the document recommendation model is adjusted using calculated loss data multiple times during a plurality of training iterations using a plurality of training data entries of a training data set; and wherein generating the set of document prediction scores includes freezing document embeddings of the set of candidate documents during the plurality of training iterations.

wherein the document recommendation model is trained to for at least one of the following: recommending a customer support response document and recommending a medical template document for generating a medical summary.

further comprising: preparing the training data entry to include the set of candidate documents from a larger superset of candidate documents, wherein the set of candidate documents includes a single correct response document to the query.

further comprising: preparing a second training data entry from the larger superset of candidate documents, wherein the second training data entry includes a different quantity of candidate documents than the first training data entry; and providing the second training data entry to the document recommendation model, whereby the document recommendation model is trained based on the second training data entry.

wherein preparing the training data entry includes serializing data of the training data entry into a binary file containing byte-strings.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for providing a training data entry including a query, a set of candidate documents to a document recommendation model, and a label indicating a correct document of the set of candidate documents; an exemplary means for generating, by the document recommendation model, a set of document prediction scores indicative of a likelihood that the set of candidate documents are responses to the query; an exemplary means for generating a pairwise score difference matrix using the set of document prediction scores; an exemplary means for transforming the pairwise score difference matrix into a score difference vector using a correct document vector, based on the label of the training data entry, that includes a one value indicative of a correct candidate document of the set of candidate documents and zero values indicative of other candidate documents of the set of candidate documents; an exemplary means for calculating loss data of the document recommendation model using the score difference vector; and an exemplary means for adjusting the document recommendation model using the calculated loss data.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a memory comprising computer program code, the memory and the computer program code configured to, with the processor, cause the processor to:

provide a first training data entry including a query, a set of candidate documents, and a label indicating a correct document of the set of candidate documents to a document recommendation model, the training data using the query once, the set of candidate documents being associated with the query;

generate, by the document recommendation model, a set of document prediction scores indicative of a likelihood that the set of candidate documents are responses to the query;

generate a pairwise score difference matrix using the set of document prediction scores;

transform the pairwise score difference matrix into a score difference vector using a correct document vector, based on the label of the first training data entry, which includes a one value indicative of a correct candidate document of the set of candidate documents and zero values indicative of other candidate documents of the set of candidate documents;

calculate loss data of the document recommendation model using the score difference vector; and adjust the document recommendation model using the calculated loss data.

2. The system of claim 1, wherein the document recommendation model is a learning-to-rank model with a transformer and a cross-attention component.

3. The system of claim 1, wherein the document recommendation model is adjusted using calculated loss data multiple times during a plurality of training iterations using a plurality of training data entries of a training data set; and wherein generating the set of document prediction scores includes freezing document embeddings of the set of candidate documents during the plurality of training iterations.

4. The system of claim 1, wherein the document recommendation model is trained for recommending a customer support response document.

5. The system of claim 1, wherein the document recommendation model is trained for recommending a medical template document for generating a medical summary.

6. The system of claim 1, wherein the memory and the computer program code are configured to, with the processor, further cause the processor to:

prepare the first training data entry to include the set of candidate documents from a larger superset of candidate documents, wherein the set of candidate documents includes a single correct response document to the query.

7. The system of claim 6, wherein the memory and the computer program code are configured to, with the processor, further cause the processor to:

prepare a second training data entry from the larger superset of candidate documents, wherein the second training data entry includes a different quantity of candidate documents than the first training data entry; and provide the second training data entry to the document recommendation model, whereby the document recommendation model is trained based on the second training data entry.

8. The system of claim 6, wherein preparing the first training data entry includes serializing data of the first training data entry into a binary file containing byte-strings.

9. A computerized method comprising:

providing a first training data entry including a query, a set of candidate documents, and a label indicating a correct document of the set of candidate documents to a document recommendation model, the training data using the query once, the set of candidate documents being associated with the query;

generating, by the document recommendation model, a set of document prediction scores indicative of a likelihood that the set of candidate documents are responses to the query;

generating a pairwise score difference matrix using the set of document prediction scores;

transforming the pairwise score difference matrix into a score difference vector using a correct document vector, based on the label of the first training data entry, which includes a one value indicative of a correct candidate document of the set of candidate documents and zero values indicative of other candidate documents of the set of candidate documents;

calculating loss data of the document recommendation model using the score difference vector; and adjusting the document recommendation model using the calculated loss data.

10. The computerized method of claim 9, wherein the document recommendation model is a learning-to-rank model with a transformer and a cross-attention component.

11. The computerized method of claim 9, wherein the document recommendation model is adjusted using calculated loss data multiple times during a plurality of training iterations using a plurality of training data entries of a training data set; and wherein generating the set of document prediction scores includes freezing document embeddings of the set of candidate documents during the plurality of training iterations.

12. The computerized method of claim 9, wherein the document recommendation model is trained for recommending a customer support response document.

13. The computerized method of claim 9, further comprising:

preparing the first training data entry to include the set of candidate documents from a larger superset of candidate documents, wherein the set of candidate documents includes a single correct response document to the query.

14. The computerized method of claim 13, further comprising:

preparing a second training data entry from the larger superset of candidate documents, wherein the second training data entry includes a different quantity of candidate documents than the first training data entry; and providing the second training data entry to the document recommendation model, whereby the document recommendation model is trained based on the second training data entry.

15. The computerized method of claim 13, wherein preparing the first training data entry includes serializing data of the first training data entry into a binary file containing byte-strings.

16. One or more computer storage media having computer-executable instructions that, upon execution by a processor, cause the processor to at least:

provide a training data entry including a query, a set of candidate documents, and a label indicating a correct document of the set of candidate documents to a document recommendation model, the training data using the query once, the set of candidate documents being associated with the query;

generate, by the document recommendation model, a set of document prediction scores indicative of a likelihood that the set of candidate documents are responses to the query;

generate a pairwise score difference matrix using the set of document prediction scores;

transform the pairwise score difference matrix into a score difference vector using a correct document vector, based on the label of the training data entry, that includes a one value indicative of a correct candidate document of the set of candidate documents and zero values indicative of other candidate documents of the set of candidate documents;

calculate loss data of the document recommendation model using the score difference vector; and adjust the document recommendation model using the calculated loss data.

17. The one or more computer storage media of claim 16, wherein the document recommendation model is a learning-to-rank model with a transformer and a cross-attention component.

18. The one or more computer storage media of claim 16, wherein the document recommendation model is adjusted using calculated loss data multiple times during a plurality of training iterations using a plurality of training data entries of a training data set; and wherein generating the set of document prediction scores includes freezing document embeddings of the set of candidate documents during the plurality of training iterations.

19. The one or more computer storage media of claim 16, wherein the computer-executable instructions, upon execution by a processor, further cause the processor to at least:

prepare the training data entry to include the set of candidate documents from a larger superset of candidate documents, wherein the set of candidate documents includes a single correct response document to the query.

20. The one or more computer storage media of claim 19, wherein preparing the training data entry includes serializing data of the training data entry into a binary file containing byte-strings.

* * * * *